(12) United States Patent
Song

(10) Patent No.: US 11,126,399 B2
(45) Date of Patent: Sep. 21, 2021

(54) METHOD AND DEVICE FOR DISPLAYING SOUND VOLUME, TERMINAL EQUIPMENT AND STORAGE MEDIUM

(71) Applicant: BEIJING MICROLIVE VISION TECHNOLOGY CO., LTD, Beijing (CN)

(72) Inventor: Yu Song, Beijing (CN)

(73) Assignee: BEIJING MICROLIVE VISION TECHNOLOGY CO., LTD, Beijing (CN)

(*) Notice: Subject to any disclaimer, the term of this patent is extended or adjusted under 35 U.S.C. 154(b) by 0 days.

(21) Appl. No.: 16/985,887

(22) Filed: Aug. 5, 2020

(65) Prior Publication Data

US 2020/0364027 A1 Nov. 19, 2020

Related U.S. Application Data

(63) Continuation of application No. PCT/CN2018/124763, filed on Dec. 28, 2018.

(30) Foreign Application Priority Data

Jul. 6, 2018 (CN) .......................... 201810737263.9

(51) Int. Cl.
G06F 3/048 (2013.01)
G06F 3/16 (2006.01)
G06F 3/0484 (2013.01)

(52) U.S. Cl.
CPC .......... *G06F 3/165* (2013.01); *G06F 3/04847* (2013.01)

(58) Field of Classification Search
CPC ........ G06F 3/165; G06F 3/167; G06F 3/0482; G06F 3/0488; G06F 3/162;
(Continued)

(56) References Cited

U.S. PATENT DOCUMENTS

| 5,491,782 A * | 2/1996 | King | G06F 3/04847 715/833 |
| 7,831,054 B2 * | 11/2010 | Ball | H04R 29/008 381/104 |

(Continued)

FOREIGN PATENT DOCUMENTS

| CN | 104281560 A | 1/2015 |
| CN | 104717563 A | 6/2015 |

(Continued)

OTHER PUBLICATIONS

International Patent Application No. PCT/CN2018/124763; Int'l Search Report; dated Apr. 8, 2019; 2 pages.

*Primary Examiner* — Steven B Theriault
(74) *Attorney, Agent, or Firm* — BakerHostetler

(57) ABSTRACT

A method for displaying sound volume, a device for displaying sound volume, terminal equipment and a storage medium are provided. The method for displaying sound volume includes acquiring a volume adjusting instruction on a video displaying interface and switching a playing progress bar on the video displaying interface to a volume line and displaying on the volume line a process of changing a length of the volume line in accordance with the volume adjusting instruction.

18 Claims, 5 Drawing Sheets

---

Acquire a volume adjusting instruction on a video displaying interface — 110

Switch a playing progress bar on the video displaying interface to a volume line in response to the volume adjusting instruction, and display on the volume line a process of changing a length of the volume line in accordance with the volume adjusting instruction — 120

(58) Field of Classification Search
CPC ............... G06F 3/04847; G06F 3/0416; G06F 3/04842; G06F 3/04845; G06F 1/1692; H04N 21/4825; H04N 21/47217; H04R 2430/01

See application file for complete search history.

(56) References Cited

U.S. PATENT DOCUMENTS

| | | | | |
|---|---|---|---|---|
| 7,954,067 B2* | 5/2011 | Breglio | ............... | G06F 3/048 715/810 |
| 8,872,735 B2* | 10/2014 | Park | ............... | G02B 27/017 345/8 |
| 8,878,799 B2* | 11/2014 | Lee | ............... | G06F 3/04847 345/173 |
| 8,954,889 B2* | 2/2015 | Fujibayashi | ............... | G06F 3/04847 715/833 |
| 9,069,452 B2* | 6/2015 | Flint | ............... | G06F 3/04847 |
| 9,129,546 B2* | 9/2015 | Lee | ............... | G09G 5/006 |
| 9,202,433 B2* | 12/2015 | Webb | ............... | H04N 9/76 |
| 9,354,797 B2* | 5/2016 | Jiao | ............... | G06F 3/04883 |
| 9,606,713 B1* | 3/2017 | Thakore | ............... | G06F 3/04883 |
| 9,658,757 B2* | 5/2017 | Wang | ............... | G06F 3/0486 |
| 9,734,797 B2* | 8/2017 | Didomenico | ............... | G09G 5/14 |
| 10,191,638 B2* | 1/2019 | Hinkel | ............... | G06F 3/0482 |
| 10,219,040 B2* | 2/2019 | Mardirossian | ... | H04N 21/47217 |
| RE47,592 E* | 9/2019 | Bhatt | ............... | G06F 3/0482 |
| 10,459,617 B2* | 10/2019 | Wloch | ............... | G06F 3/04847 |
| 10,536,123 B2* | 1/2020 | Marino | ............... | H03G 11/00 |
| 10,761,709 B2* | 9/2020 | Perrey | ............... | G01S 7/52053 |
| 2005/0262451 A1* | 11/2005 | Remignanti | ............... | G06F 3/04847 715/833 |
| 2007/0192744 A1* | 8/2007 | Reponen | ............... | G06F 3/0488 715/833 |
| 2008/0190266 A1* | 8/2008 | Kim | ............... | G11B 27/105 84/602 |
| 2009/0153495 A1* | 6/2009 | Chen | ............... | G06F 3/04883 345/173 |
| 2010/0058228 A1* | 3/2010 | Park | ............... | G06F 3/04847 715/786 |
| 2010/0156830 A1* | 6/2010 | Homma | ............... | G06F 3/0488 345/173 |
| 2010/0241962 A1* | 9/2010 | Peterson | ............... | G11B 27/34 715/720 |
| 2010/0293468 A1* | 11/2010 | Thijssen | ............... | G06F 3/165 715/727 |
| 2010/0303440 A1* | 12/2010 | Lin | ............... | H04N 21/6581 386/241 |
| 2010/0306694 A1* | 12/2010 | Conzola | ............... | G06F 3/04847 715/786 |
| 2011/0167347 A1* | 7/2011 | Joo | ............... | G06F 3/04847 715/716 |
| 2011/0246943 A1* | 10/2011 | Fujibayashi | ............... | G06F 3/0488 715/833 |
| 2011/0275416 A1* | 11/2011 | Chang | ............... | G06F 3/04883 455/566 |
| 2012/0110510 A1* | 5/2012 | Cindy | ............... | G06F 3/0482 715/833 |
| 2012/0170772 A1* | 7/2012 | Zheng | ............... | G11B 20/10527 381/107 |
| 2012/0280922 A1* | 11/2012 | Lee | ............... | G06F 3/0485 345/173 |
| 2013/0038546 A1* | 2/2013 | Mineo | ............... | G06F 3/0488 345/173 |
| 2013/0061180 A1* | 3/2013 | Dongen | ............... | G06F 3/04847 715/847 |
| 2013/0097508 A1* | 4/2013 | Matejka | ............... | H04L 65/4084 715/720 |
| 2013/0191747 A1* | 7/2013 | Choi | ............... | G06F 3/0485 715/716 |
| 2013/0239057 A1* | 9/2013 | Ubillos | ............... | G06F 3/04842 715/833 |
| 2013/0298021 A1* | 11/2013 | Park | ............... | G11B 27/34 715/716 |
| 2014/0079247 A1* | 3/2014 | Sanders | ............... | H03G 7/00 381/109 |
| 2014/0282252 A1* | 9/2014 | Edwards | ............... | G06F 3/04847 715/833 |
| 2014/0285455 A1* | 9/2014 | Jiang | ............... | G06F 3/0488 345/173 |
| 2014/0369527 A1* | 12/2014 | Baldwin | ............... | H03G 3/20 381/107 |
| 2014/0372109 A1* | 12/2014 | Iyer | ............... | H03G 3/32 704/225 |
| 2015/0153943 A1* | 6/2015 | Wang | ............... | G06F 3/0486 715/716 |
| 2015/0205511 A1* | 7/2015 | Vinna | ............... | G06F 3/0481 715/716 |
| 2015/0253936 A1* | 9/2015 | Marra | ............... | H04M 1/6016 715/716 |
| 2015/0261376 A1* | 9/2015 | Kim | ............... | G06F 1/1626 345/173 |
| 2016/0026371 A1* | 1/2016 | Lu | ............... | G06F 3/04886 715/765 |
| 2016/0253087 A1* | 9/2016 | Moon | ............... | G06F 3/0488 715/720 |
| 2016/0266781 A1* | 9/2016 | Dandu | ............... | G06F 3/04847 |
| 2016/0306539 A1* | 10/2016 | Frumar | ............... | H04N 21/47217 |
| 2017/0185240 A1* | 6/2017 | Delrosario | ............... | G06F 3/04847 |
| 2018/0039398 A1* | 2/2018 | Schaerges | ............... | G06F 3/04847 |
| 2018/0074784 A1* | 3/2018 | Tsukada | ............... | H04Q 9/00 |
| 2018/0239509 A1* | 8/2018 | Hinckley | ............... | G06F 3/0488 |
| 2018/0275850 A1* | 9/2018 | Seol | ............... | G06F 3/044 |
| 2018/0349005 A1* | 12/2018 | Bhargava | ............... | G06F 3/04847 |
| 2018/0364901 A1* | 12/2018 | Fan | ............... | G06F 3/04847 |
| 2020/0174642 A1* | 6/2020 | Perrey | ............... | G06F 3/04812 |

FOREIGN PATENT DOCUMENTS

| | | |
|---|---|---|
| CN | 105938412 A | 9/2016 |
| CN | 106782623 A | 5/2017 |
| CN | 107368277 A | 11/2017 |
| CN | 107741815 A | 2/2018 |
| CN | 107861665 A | 3/2018 |
| CN | 108920060 A | 11/2018 |

* cited by examiner

METHOD AND DEVICE FOR DISPLAYING SOUND VOLUME, TERMINAL EQUIPMENT AND STORAGE MEDIUM

The present application is a continuation of International Patent Application No. PCT/CN2018/124763 filed on Dec. 28, 2018, which claims priority to Chinese Patent Application No. 201810737263.9, filed on Jul. 6, 2018 with the Chinese Patent Office, both of which are incorporated herein by reference in their entireties.

FIELD

The present disclosure relates to the field of video playing technology, in particular to a method for displaying sound volume, a device for displaying sound volume, a terminal and a storage medium.

BACKGROUND

With the rapid development of information technology, there are more and more video player software used in terminals. Users may use video player software to view web videos or local videos.

When a user wants to adjust a sound volume while viewing a video using conventional video player software, a volume view is displayed in the central position of a video player interface. Though the volume view is displayed markedly to make it easy for the user to know a process of volume adjusting, the volume view influences the user viewing the video.

SUMMARY

Below is a summary of the subject described in detail according to the present disclosure. The summary does not intend to limit the protection scope of the claims.

According to embodiments of the present disclosure, a method for displaying sound volume, a device for displaying sound volume, a terminal and a storage medium are provided.

In a first aspect of embodiments of the present disclosure, a method for displaying sound volume is provided, which includes acquiring a volume adjusting instruction on a video displaying interface, switching a playing progress bar on the video displaying interface to a volume line in response to the volume adjusting instruction, and displaying on the volume line a process of changing a length of the volume line in accordance with the volume adjusting instruction.

In a second aspect of embodiments of the present disclosure, a device for displaying sound volume is provided, which includes an adjusting instruction acquiring module and a volume line switching module. The adjusting instruction acquiring module configured to acquire a volume adjusting instruction on a video displaying interface. The volume line switching module is configured to switch a playing progress bar on the video displaying interface to a volume line in response to the volume adjusting instruction and display on the volume line a process of changing a length of the volume line in accordance with the volume adjusting instruction.

In a third aspect of embodiments of the present disclosure, terminal equipment is provided, which includes at least one processor and a storage device. The storage device is configured to store at least one program. The at least one program, when being executed by the at least one processor, causes the at least one processor to execute the method for displaying sound volume according to any one of embodiments in the present disclosure.

In a fourth aspect of embodiments of the present disclosure, a computer readable storage medium is provided. The computer readable storage medium stores a computer program. The computer program is used to, when being executed by a processor, execute the method for displaying sound volume according to any one of embodiments in the present disclosure.

Other aspects may be understood by reading detailed descriptions and drawings.

DETAILED DESCRIPTION

The technical solution of the present disclosure is described in detail below in conjunction with the drawings and embodiments. It is understood that specific embodiments described herein are used to explain, rather than limiting, the technical solution of the present disclosure. It is noted that for ease of description, the drawings only show related parts rather than all parts of the present disclosure.

Figure 1A:
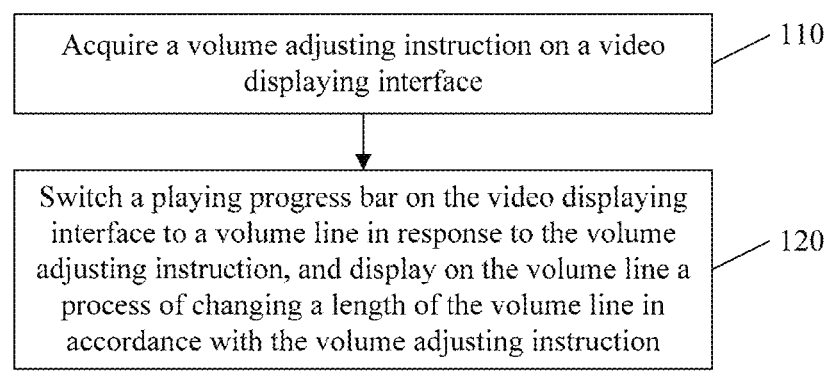
FIG. 1a is a flowchart of a method for displaying sound volume according to an embodiment of the present disclosure.

FIG. 1a is a flowchart of a method for displaying sound volume according to an embodiment of the present disclosure. The present embodiment may be applied to a case that a user adjusts a sound volume when viewing a video. The method may be performed by a device for displaying sound volume. The device may be implemented by at least one of software and hardware, and is generally integrated in terminal equipment, such as a mobile phone and a tablet computer. The method includes steps 110 and 120.

In step 110, a volume adjusting instruction is acquired on a video displaying interface. The video displaying interface includes a video playing interface or a video pausing interface. A user may click a volume button to adjust a sound volume while a video is played or paused. A playing progress bar is displayed on the video displaying interface to indicate the current playing progress of the video. A volume adjusting instruction of the user may be acquired by the volume button on the video displaying interface. The volume adjusting instruction includes a volume increasing instruction or a volume decreasing instruction. If it is detected that the user clicks a volume increasing button, the volume increasing instruction is acquired. If it is detected that the user clicks a volume decreasing button, the volume decreasing instruction is acquired.

In step 120, in response to the volume adjusting instruction, the playing progress bar on the video displaying interface is switched to a volume line and a process of changing a length of the volume line in accordance with the volume adjusting instruction is displayed on the volume line.

After the volume adjusting instruction is acquired, the playing progress bar on the video displaying interface is switched to the volume line and the process of adjusting a sound volume according to the volume adjustment instruction is shown on the volume line. That is, the process of changing the length of the volume line in accordance with the volume adjusting instruction is shown. For example, after a volume increasing instruction is acquired, the playing progress bar is switched to a volume line, a volume level before acquiring the volume increasing instruction is displayed on the volume line, and the process of increasing based on the volume level by a determined level is displayed on the volume line. After a volume decreasing instruction is acquired, the playing progress bar is switched to a volume line, a volume level before acquiring the volume decreasing instruction is displayed on the volume line, and the process of decreasing based on the volume level by a determined level is displayed on the volume line.

In an embodiment, the color of the volume displayed on the volume line is different from the color of the playing progress displayed on the playing progress bar, which is convenient for a user to recognize the process of switching the playing progress bar to the volume line, thereby improving the user experience.

Figure 1B:
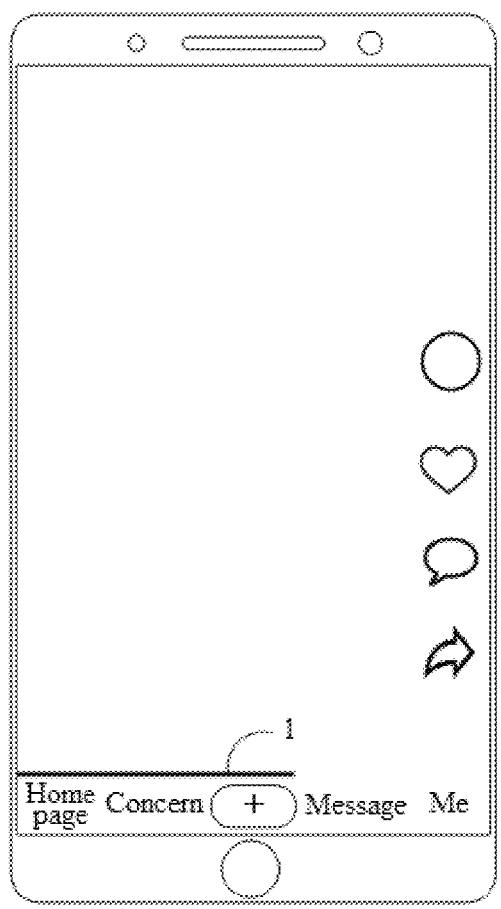
FIG. 1b is a schematic diagram showing a playing progress bar displayed on a video displaying interface according to an embodiment of the present disclosure.
Figure 1C:
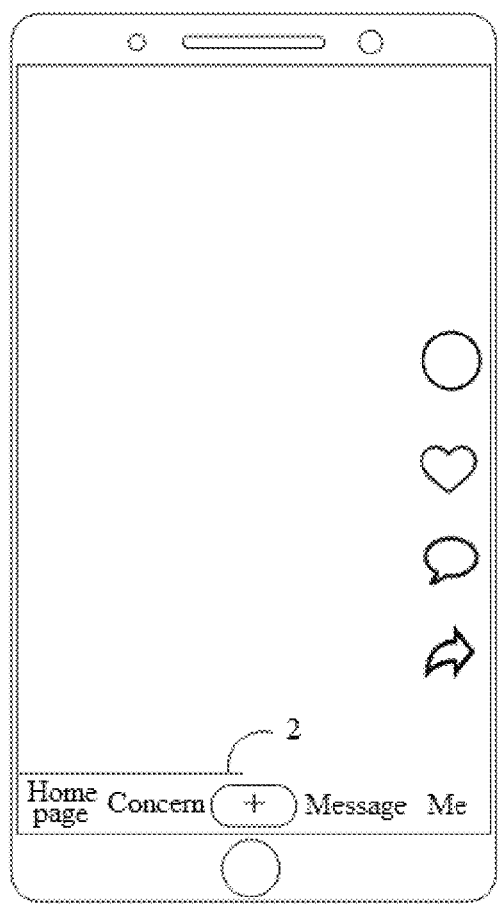
FIG. 1c is a schematic diagram showing a volume line displayed on a video displaying interface according to an embodiment of the present disclosure.

For example, FIG. 1b is a schematic diagram showing a playing progress bar displayed on a video displaying interface according to an embodiment of the present disclosure. As shown in FIG. 1b, a playing progress bar 1 is displayed at the bottom edge of the video displaying interface and the current playing progress is displayed on the playing progress bar 1. As the video is played, the playing progress advances to the right of the playing progress bar 1. While playing the video, a volume adjusting instruction of a user is acquired and the playing progress bar is switched to a volume line, as shown in FIG. 1c. The color of the displayed volume line 2 is different from that of the displayed playing progress bar, which is convenient for a user to know that the playing progress bar is switched to the volume line.

According to technical solutions of the present embodiment, after acquiring the volume adjusting instruction on the video displaying interface, the playing progress bar on the video displaying interface is switched to a volume line, and the process of changing the length of the volume line in accordance with the volume adjusting instruction is displayed. Since the playing progress bar is displayed at the edge of the video displaying interface as a line, after the switching the display of the volume line does not disturb a user viewing a video, which prevents the display of the volume from influencing the user viewing the video, thereby improving the user experience.

Based on the above technical solutions, after the process of changing the length of the volume line in accordance with the volume adjusting instruction is displayed on the volume line, the method may further include a step of displaying, in response to another detected volume adjusting instruction, on the volume line a process of changing the length of the volume line in accordance with the another detected volume adjusting instruction.

After adjusting the volume in response to a volume adjusting instruction, if another volume adjusting instruction is detected, the process of changing the length of the volume line in accordance with the another volume adjusting instruction is displayed on the volume line based on the last adjusted volume displayed on the volume line. For example, if a volume increasing instruction is acquired first, the playing progress bar is switched to the volume line, then a volume level before acquiring the volume increasing instruction is displayed on the volume line, and the process of increasing based on the volume level by a determined volume is displayed on the volume line. If another volume increasing instruction is detected later, a process of increasing from the increased volume level by a determined volume is displayed. If a volume decreasing instruction is acquired, the playing progress bar is switched to the volume line, then a volume level before acquiring the volume decreasing instruction is displayed on the volume line, and the process of decreasing based on the volume level by a determined volume is displayed on the volume line. If another volume decreasing instruction is detected later, the process of decreasing from the decreased volume line by a determined volume is displayed. Apparently, it may be a case that a volume increasing instruction is acquired before a volume decreasing instruction is acquired, or a volume decreasing instruction is acquired before a volume increasing instruction is acquired, for which the adjusting processes are similar to the above. By displaying the volume adjusting process intuitively, a user can know the volume adjusting process clearly, thereby improving the user experience.

Based on the above technical solutions, after the process of changing the length of the volume line in accordance with the volume adjusting instruction is displayed on the volume line, the method may further include switching the volume line back to the playing progress bar, and display a current playing progress in response to that no volume instruction is detected in a pre-determined period of time.

The pre-determine period of time may be determined as required. For example, the pre-determined period of time may be determined as 400 ms.

After the volume is adjusted by a user, if no volume adjustment instruction is detected in the pre-determined period of time, the volume line is switched back to the playing progress bar, and the current playing progress is displayed. That is, if the video keeps playing while adjusting the volume, the current playing progress is acquired to be displayed on the playing progress bar when the volume line is switched back to the playing progress bar.

Figure 2:
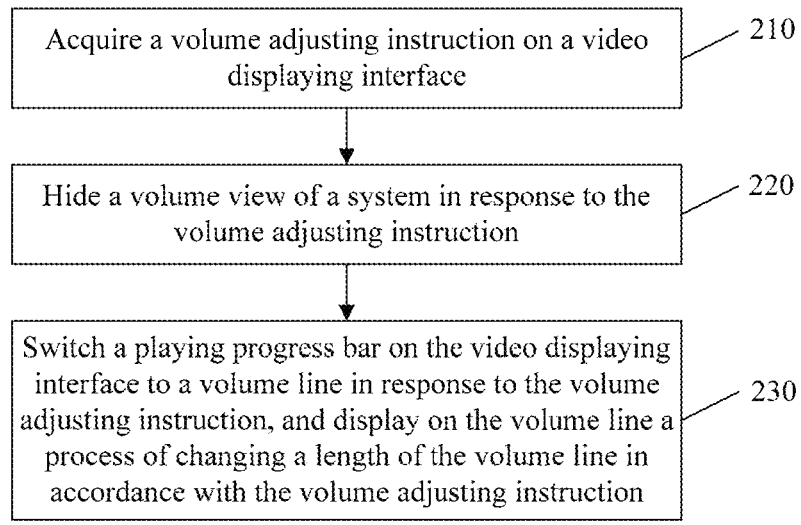
FIG. 2 is a flowchart of a method for displaying sound volume according to an embodiment of the present disclosure.

FIG. 2 is a flowchart of a method for displaying sound volume according to an embodiment of the present disclosure. The present embodiment includes more details than the above embodiments. For example, the present embodiment also includes hiding a volume view of a system in response to the volume adjusting instruction. The method includes step 210 to step 230.

In step 210, a volume adjusting instruction is acquired on a video displaying interface.

In step 220, a volume view of a system is hidden in response to the volume adjusting instruction.

After the volume adjusting instruction is acquired, the volume view of the system is hidden to avoid a popup of the volume view of the system which may disturb a user viewing a video.

The volume view of the system may be hidden by any one of moving the volume view to an outside of a display area, shielding an interface for calling the volume view and displaying the volume view in a transparent manner.

The display area generally has a specific coordinate range. Moving the volume view to an outside of the display area means moving the volume view to an outside of the coordinate range of the display area, which can achieve a hidden volume view of the system. The interface for calling the volume view is shielded when the volume adjusting instruction is acquired, so that the volume view is no longer called, which can achieve a hidden volume view of the system. The volume view of the system is no longer viewed by displaying the whole volume view of the system in the transparent manner, which can achieve a hidden volume view of the system. The above methods of hiding the volume view of the system are only examples. Those skilled in the art may understand that the method of hiding the volume view of the system is not limited to the above methods, and may be other methods as long as the volume view of the system is hidden.

In step 230, a playing progress bar on the video displaying interface is switched to a volume line, and a process of changing a length of the volume line in accordance with the volume adjusting instruction is displayed on the volume line.

According to technical solutions of the present embodiment, the volume view of the system is hidden after the volume adjusting instruction is acquired, so that the volume view of the system is not displayed and it is only required to switch the playing progress bar to the volume line and display the process of volume adjusting, thereby improving the user experience.

Figure 3:
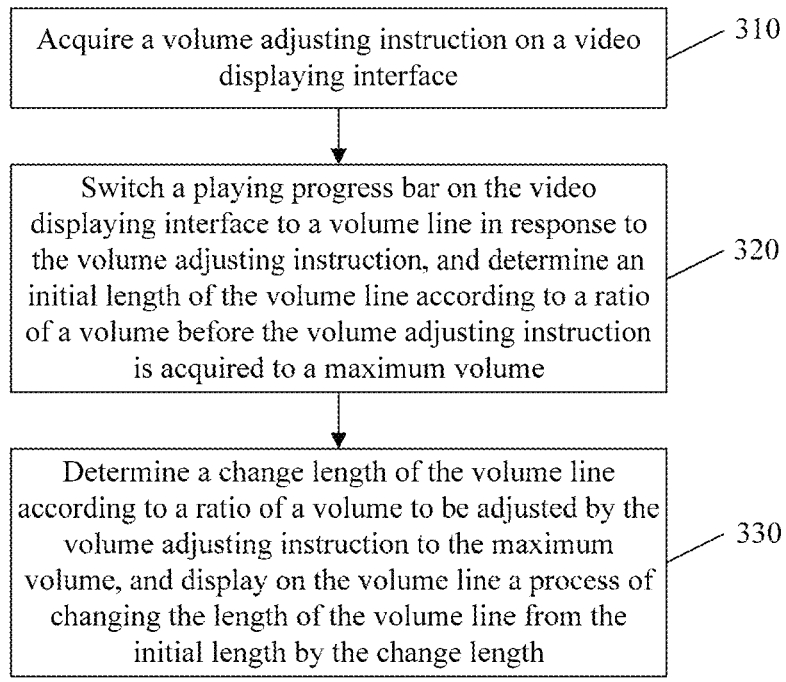
FIG. 3 is a flowchart of a method for displaying sound volume according to an embodiment of the present disclosure.

FIG. 3 is a flowchart of a method for displaying sound volume according to an embodiment of the present disclosure. The present embodiment includes more details than the above embodiments. For example, the displaying on the volume line the process of changing the length of the volume line in accordance with the volume adjusting instruction includes determining an initial length of the volume line based on a ratio of a volume before the volume adjusting instruction is acquired to a maximum volume, determining a change length of the volume line according to a ratio of a volume to be adjusted by the volume adjusting instruction to the maximum volume, and displaying on the volume line a process of changing the length of the volume line within the change length based on the initial length. The method includes step 310 to step 320.

In step 310, a volume adjusting instruction is acquired on a video displaying interface.

In step 320, a playing progress bar on the video displaying interface is switched to a volume line in response to the volume adjusting instruction, and an initial length of the volume line is determined according to a ratio of a volume before the volume adjusting instruction is acquired to a maximum volume.

When the volume adjusting instruction is acquired, the playing progress bar on the video displaying interface is switched to the volume line, and the ratio of the volume before the volume adjusting instruction is acquired to the maximum volume is determined, to determine the initial length of the volume line according to the ratio of the volume before the volume adjusting instruction is acquired to the maximum volume.

In step 330, a change length of the volume line is determined according to a ratio of a volume to be adjusted by the volume adjusting instruction to the maximum volume, and a process of changing the length of the volume line within the change length based on the initial length is displayed on the volume line.

The volume adjusting instruction includes a volume increasing instruction or a volume decreasing instruction.

The volume to be adjusted by each volume adjusting instruction is constant, that is, the volume to be increased or to be decreased is constant for each pressing of the volume increase button or the volume decrease button by the user. Therefore the ratio of the volume to be adjusted by each volume adjusting instruction to the maximum volume is constant. For example, in a case that the volume adjusting instruction is a volume increasing instruction, the change length of the volume line is determined as increasing by the pre-determined length. In a case that the volume adjusting instruction is a volume decreasing instruction, the change length of the volume line is determined as decreasing by the pre-determined length. After the change length of the volume line is determined, a process of changing the length of the volume line within the change length based on the initial length is displayed on the volume line. For example, in a case that the change length of the volume line indicates increasing by the pre-determined length, the process of increasing the length of the volume line based on the initial length by the pre-determined length is displayed on the volume line, after which the volume line increased by the pre-determined length is displayed. In a case that the change length of the volume line indicates decreasing by the pre-determined length, the process of decreasing the length of the volume line based on the initial length by the pre-determined length is displayed on the volume line, after which the volume line decreased by the pre-determined length is displayed.

In the technical solutions according to the present embodiment, on the basis of the above embodiments, by determining the initial length of the volume line according to the ratio of a volume before the volume adjusting instruction is acquired to the maximum volume and determining the change length of the volume line according to the ratio of a volume to be adjusted by the volume adjusting instruction to the maximum volume, and displaying on the volume line a process of changing the length of the volume line within the change length based on the initial length, a user may know the process of adjusting the volume intuitively, thereby improving the user experience.

Figure 4:
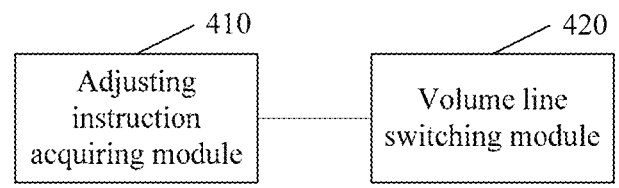
FIG. 4 is a schematic structural diagram of a device for displaying sound volume according to an embodiment of the present disclosure.

FIG. 4 is a schematic structural diagram showing a device for displaying sound volume according to an embodiment of the present disclosure. The present embodiment is applied to a case of adjusting a sound volume while viewing a video. The device may perform the method for displaying sound volume. The device may be implemented by at least one of software and hardware, and is generally integrated in terminal equipment, such as a mobile phone or a tablet computer. As shown in FIG. 4, the device for displaying sound volume according to the present embodiment includes an adjusting instruction acquiring module 410 and a volume line switching module 420.

The adjusting instruction acquiring module 410 is configured to acquire a volume adjusting instruction on a video displaying interface.

The volume line switching module 420 is configured to switch a playing progress bar on the video displaying interface to a volume line in response to the volume adjusting instruction, and display on the volume line a progress of changing a length of the volume line in accordance with the volume adjusting instruction.

In an embodiment, the device further includes a volume adjusting module. The volume adjusting module is configured to display, in response to another detected volume adjusting instruction, on the volume line a process of changing the length of the volume line in accordance with the another detected volume adjusting instruction, after the process of changing the length of the volume line in accordance with the volume adjusting instruction is displayed on the volume line.

In an embodiment, the device further includes a progress bar switching module. The progress bar switching module is configured to switch the volume line back to the playing progress bar and display a current playing progress of a video in response to that no volume adjusting instruction is detected in a pre-determined period of time after the process of changing the length of the volume line in accordance with the volume adjusting instruction is displayed on the volume line.

In an embodiment, the device further includes a volume view hiding module. The volume view hiding module is configured to hide a volume view of a system in response to the volume adjusting instruction.

In an embodiment, the volume view hiding module is configured to perform any one of moving the volume view to an outside of a display area, shielding an interface for calling the volume view and displaying the volume view in a transparent manner.

In an embodiment, a color of a volume displayed on the volume line is different from a color of a playing progress displayed on the playing progress bar.

In an embodiment, the volume line switching module includes an initial length determining unit and a change process displaying unit. The initial length determining unit is configured to determine an initial length of the volume line according to a ratio of a volume before the volume adjusting instruction is acquired to a maximum volume. The change process displaying unit is configured to determine a change length of the volume line according to a ratio of a volume to be adjusted by the volume adjusting instruction to the maximum volume, and display on the volume line a process of changing the length of the volume line within the change length based on the initial length.

The above device for displaying sound volume may perform the method for displaying sound volume according to any embodiments of the present disclosure, and include corresponding functional modules for performing the method. For technical details not described in the present embodiment, one may refer to the method for displaying sound volume according to any embodiments of the present disclosure.

Figure 5:
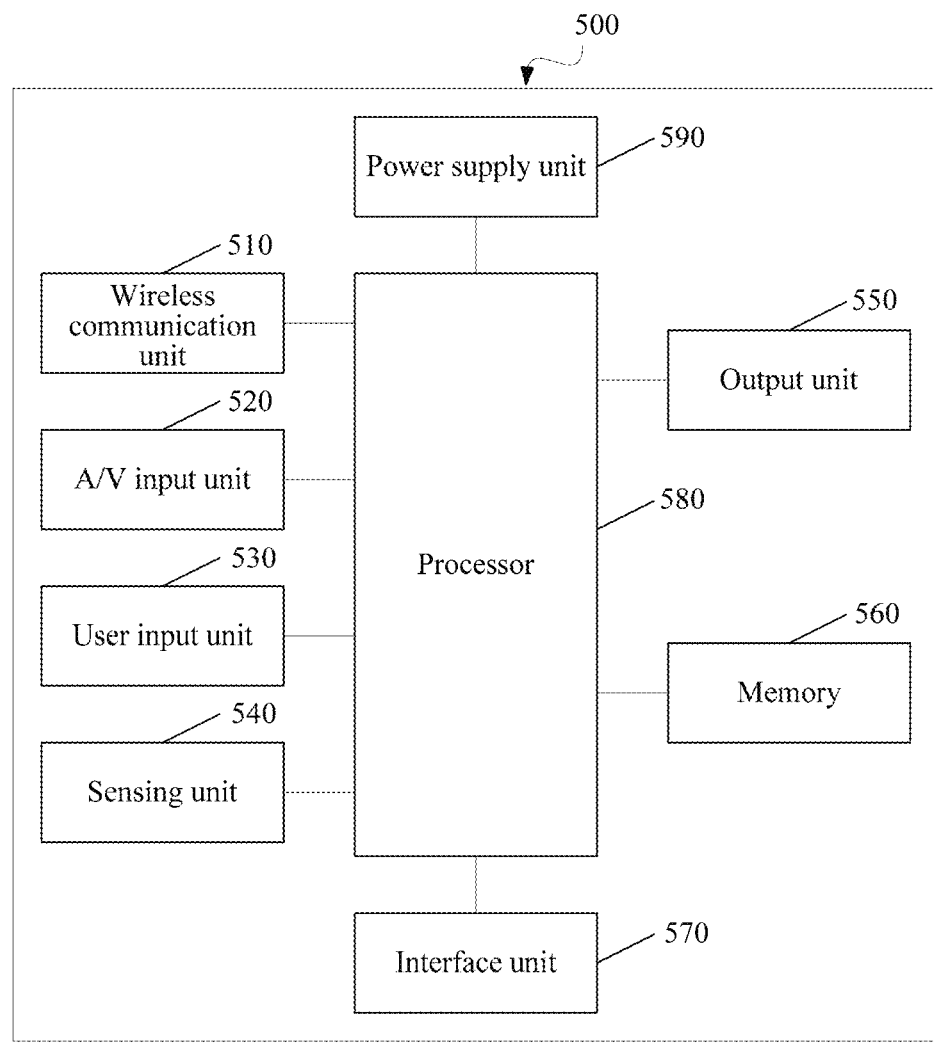
FIG. 5 is a schematic hardware structural diagram of terminal equipment according to an embodiment of the present disclosure.

FIG. 5 is a schematic hardware structural diagram of terminal equipment according to an embodiment of the present disclosure. The terminal equipment may be implemented in various forms. The terminal equipment according to the present disclosure includes but is not limited to mobile terminal equipment such as a mobile phone, a smart phone, a laptop computer, a digital broadcast receiver, a PDA (personal digital assistant), a PAD (tablet computer), a PMP (Portable Multimedia Player), a navigation device, a vehicle terminal equipment, a vehicle display terminal, and a vehicle electronic rearview mirror, and fixed terminal equipment such as a digital TV and a desk computer.

As shown in FIG. 5, the terminal equipment 500 may include a wireless communication unit 510, an Audio/Video (A/V) input unit 520, a user input unit 530, a sensing unit 540, an output unit 550, a memory 560, an interface unit 570, a processor 580, a power supply unit 590, and the like. FIG. 5 shows terminal equipment with various modules, but it should be understood that not all shown modules are necessary, and more or less modules may be implemented alternatively.

The wireless communication unit 510 allows wireless communication between the terminal equipment 500 and a wireless communication system or a wireless communication network. The A/V input unit 520 is configured to receive an audio signal or a video signal. The user input unit 530 may generate key input data based on a command inputted by a user, to control various operations of the terminal equipment. The sensing unit 540 is configured to detect a current state of the terminal equipment 500, a location of the terminal equipment 500, presentence of a touch input of a user to the terminal equipment 500, the orientation of the terminal equipment 500, accelerated or decelerated movement of the terminal equipment 500, and a direction of movement of the terminal equipment 500, to generate a command or a signal for controlling the operation of the terminal equipment 500. The interface unit 570 is configured to allow connection and communication between at least one external device and the terminal equipment 500. The output unit 550 is configured to output a signal in a visual, audio and/or tactile way. The memory 560 may store software programs of processes and controlling operations executed by the controller 580. The memory 560 may also temporarily store data to be outputted or data already outputted. The memory 560 may include at least one type of storage medium. Furthermore, the terminal equipment 500 may collaborate with network memory device having the storage function of the memory 560 via a network connection. The processor 580 usually controls overall operations of the terminal equipment. In addition, the processor 580 may include a multimedia module configured to reproduce or playback multimedia data. The processor 580 may execute pattern recognition processing to recognize handwriting input or picture drawing input on a touch screen as a character or an image. Under the control of the processor 580, the power supply unit 590 receives external electric power or internal electric power and provides proper electric power required for operating various elements and modules.

The processor 580 executes various functions and data processing of the terminal equipment 500 by running software programs stored in the system memory 560. For example, The processor 580 performs the method for displaying sound volume according to embodiments of the present disclosure, including acquiring a volume adjustment instruction on a video displaying interface, and switching a playing progress bar on the video displaying interface to a volume line in response to the volume adjusting instruction and displaying on the volume line a process of changing a length of the volume line in accordance with the volume adjusting instruction.

According to an embodiment of the present disclosure, a storage medium including computer executable instructions is provided. The computer executable instructions are used to execute a method for displaying sound volume when being executed by a computer processor. The method for displaying sound volume includes acquiring a volume adjusting instruction on a video displaying interface, and switching a playing progress bar on the video displaying interface to a volume line in response to the volume adjusting instruction, and displaying on the volume line a process of changing a length of the volume line in accordance with the volume adjusting instruction.

Certainly, in the storage medium including the computer executable instructions according to embodiments of the present disclosure, the computer executable instructions are not limited to operations in the above method. The computer executable instructions can also be used to execute operations in the method for displaying sound volume according to any embodiments of the present disclosure.

Through the above descriptions of embodiments, those skilled in the art may clearly understand that the present disclosure may be implemented by software and necessary general hardware or may be implemented only by hardware. Based on this understanding, the essence or contributions to related technologies made by the present disclosure may be implemented by a software product. The computer software product may be stored in a computer readable storage medium such as a computer floppy disk, a Read Only Memory (ROM), a Random Access Memory (RAM), a flash memory (FLASH), a hard disk, a disk and the like of a computer. The computer software products include several instructions used to make a computer device (which may be a personal computer, a server or a network device) execute the methods according to the embodiments of the present disclosure.

It is noted that, the various units and modules included in the above embodiments of the device for displaying sound volume are divided according to functional logic, but are not limited to the above division as long as corresponding functions can be realized. In addition, specific names of the functional units are used only for distinguish from each other, instead of limiting the protection scope of the present disclosure.

The invention claimed is:

1. A method for displaying sound volume adjustment, comprising:
   receiving an instruction of adjusting sound volume on an interface for displaying a video, wherein the interface comprises a progress bar indicating a dynamic progress of playing the video;
   determining an initial length of a volume line based on determining a first ratio of a volume prior to receiving the instruction to a maximum volume;
   automatically replacing the progress bar with the volume line to display the volume line with the initial length at a same location on the interface;
   determining a change from the initial length of the volume line based on determining a second ratio of a change of the sound volume to the maximum volume, wherein the change of the sound volume is determined based on the instruction; and
   automatically and dynamically displaying the change from the initial length of the volume line on the interface based on executing the instruction.

2. The method according to claim 1, wherein after the automatically displaying the change from the initial length of the volume line, the method further comprises:
   in response to receiving and executing a second instruction of adjusting the sound volume, displaying a second change of a length of the volume line.

3. The method according to claim 1, wherein after the automatically displaying the change from the initial length of the volume line, the method further comprises:
   replacing the volume line with the progress bar at the same location and displaying the dynamic progress of playing the video when no other instruction of adjusting the sound volume is detected within a predetermined period of time.

4. The method according to claim 1, further comprising:
   hiding a volume view of a system in response to receiving the instruction of adjusting sound volume.

5. The method according to claim 4, wherein the hiding a volume view of a system comprises any one of:
   moving the volume view to an outside of a display area;
   shielding an interface for calling the volume view; or
   displaying the volume view in a transparent manner.

6. The method according to claim 1, wherein a color of the volume line is different from a color of the progress bar.

7. A terminal equipment, comprising:
   at least one processor; and
   a storage device configured to store at least one program, wherein the at least one program, when being executed by the at least one processor, causes the at least one processor to execute operations of:
   receiving an instruction of adjusting sound volume on an interface for displaying a video, wherein the interface comprises a progress bar indicating a dynamic progress of playing the video;
   determining an initial length of a volume line based on determining a first ratio of a volume prior to receiving the instruction to a maximum volume;
   automatically replacing the progress bar with the volume line to display the volume line with the initial length at a same location on the interface;
   determining a change from the initial length of the volume line based on determining a second ratio of a change of the sound volume to the maximum volume, wherein the change of the sound volume is determined based on the instruction; and
   automatically and dynamically displaying the change from the initial length of the volume line on the interface based on executing the instruction.

8. The terminal equipment according to claim 7, wherein after the automatically displaying the change from the initial length of the volume line, the operations further comprise:
   in response to receiving and executing a second instruction of adjusting the sound volume, displaying a second change of a length of the volume line.

9. The terminal equipment according to claim 7, wherein after the automatically displaying the change from the initial length of the volume line, the operations further comprise:
   replacing the volume line with the progress bar at the same location and displaying the dynamic progress of playing the video when no other instruction of adjusting the sound volume is detected within a predetermined period of time.

10. The terminal equipment according to claim 7, wherein the operations further comprise:
    hiding a volume view of a system in response to receiving the instruction of adjusting sound volume.

11. The terminal equipment according to claim 10, wherein the hiding a volume view of a system comprises any one of:
    moving the volume view to an outside of a display area;
    shielding an interface for calling the volume view; or
    displaying the volume view in a transparent manner.

12. The terminal equipment according to claim 7, wherein a color of the volume line is different from a color of the progress bar.

13. A non-transitory computer readable storage medium storing a computer program, wherein the computer program is used to, when being executed by a processor, cause the processor to perform operations, the operations comprising:
    receiving an instruction of adjusting sound volume on an interface for displaying a video, wherein the interface comprises a progress bar indicating a dynamic progress of playing the video;
    determining an initial length of a volume line based on determining a first ratio of a volume prior to receiving the instruction to a maximum volume;
    automatically replacing the progress bar with the volume line to display the volume line with the initial length at a same location on the interface;

determining a change from the initial length of the volume line based on determining a second ratio of a change of the sound volume to the maximum volume, wherein the change of the sound volume is determined based on the instruction; and automatically and dynamically displaying the change from the initial length of the volume line on the interface based on executing the instruction.

14. The non-transitory computer readable storage medium according to claim 13, wherein after the automatically displaying the change from the initial length of the volume line, the operations further comprise:

in response to receiving and executing a second instruction of adjusting the sound volume, displaying a second change of a length of the volume line.

15. The non-transitory computer readable storage medium according to claim 13, wherein after the automatically displaying the change from the initial length of the volume line, the operations further comprise:

replacing the volume line with the progress bar at the same location and displaying the dynamic progress of playing the video when no other instruction of adjusting the sound volume is detected within a predetermined period of time.

16. The non-transitory computer readable storage medium according to claim 13 wherein the operations further comprise:

hiding a volume view of a system in response to receiving the instruction of adjusting sound volume.

17. The non-transitory computer readable storage medium according to claim 16, wherein the hiding a volume view of a system comprises any one of:

moving the volume view to an outside of a display area;
shielding an interface for calling the volume view; or
displaying the volume view in a transparent manner.

18. The non-transitory computer readable storage medium according to claim 13, wherein a color of the volume line is different from a color of the progress bar.

* * * * *